(12) United States Patent
Harvey et al.

(10) Patent No.: US 10,176,102 B2
(45) Date of Patent: Jan. 8, 2019

(54) OPTIMIZED READ CACHE FOR PERSISTENT CACHE ON SOLID STATE DEVICES

(71) Applicant: Infinio Systems, Inc., Cambridge, MA (US)

(72) Inventors: David W. Harvey, Newton, MA (US); Scott H. Davis, Needham, MA (US); Martin Charles Martin, Lexington, MA (US); Vishal Misra, New York, NY (US); Hooman Vassef, Arlington, MA (US)

(73) Assignee: Infinio Systems, Inc., Cambridge, MA (US)

( * ) Notice: Subject to any disclaimer, the term of this patent is extended or adjusted under 35 U.S.C. 154(b) by 46 days.

(21) Appl. No.: 15/085,485

(22) Filed: Mar. 30, 2016

(65) Prior Publication Data

US 2017/0286307 A1    Oct. 5, 2017

(51) Int. Cl.
*G06F 12/08*     (2016.01)
*G06F 12/0866*   (2016.01)
*G06F 12/1018*   (2016.01)

(52) U.S. Cl.
CPC ...... *G06F 12/0866* (2013.01); *G06F 12/1018* (2013.01); *G06F 2212/1004* (2013.01);
(Continued)

(58) Field of Classification Search
CPC ........... G06F 17/30097; G06F 12/0802; G06F 12/0811; G06F 17/30368;
(Continued)

(56) References Cited

U.S. PATENT DOCUMENTS 3,848,234 A * 11/1974 MacDonald ........ G06F 12/0833
                                                    711/109
2014/0280664 A1* 9/2014 Sengupta ............ H04L 67/2842
                                                    709/212
(Continued)

OTHER PUBLICATIONS

Bhagwat et al, "A Practical Implementation of Clustered Fault Tolerant Write Acceleration in a Virtualized Environment," 13th Usenix Conference on File and Storage Technologies, pp. 287-300, Feb. 2015.

(Continued)

*Primary Examiner* — Hashem Farrokh
(74) *Attorney, Agent, or Firm* — Nields, Lemack & Frame, LLC

(57) ABSTRACT

Systems and methods for a content addressable cache that is optimized for SSD use are disclosed. In some embodiments, the cache utilizes an identifier array where identification information is stored for each entry in the cache. However, the size of the bit field used for the identification information is not sufficient to uniquely identify the data stored at the associated entry in the cache. A smaller bit field increases the likelihood of a "false positive", where the identification information indicates a cache hit when the actual data does not match the digest. A larger bit field decreases the probability of a "false positive", at the expense of increased metadata memory space. Thus, the architecture allows for a compromise between metadata memory size and processing cycles.

16 Claims, 8 Drawing Sheets

(52) U.S. Cl.
CPC .. *G06F 2212/214* (2013.01); *G06F 2212/222* (2013.01); *G06F 2212/281* (2013.01)

(58) Field of Classification Search
CPC ....... G06F 2212/1032; G06F 2212/313; G06F 12/10; G06F 12/1027; G06F 2212/222; G06F 2212/60; G06F 3/064; G06F 12/0866; G06F 2212/281; G06F 2212/1004; G06F 2212/214; H04L 67/2842
USPC .......................................................... 711/3
See application file for complete search history.

(56) References Cited

U.S. PATENT DOCUMENTS

| | | | | |
|---|---|---|---|---|
| 2015/0378642 | A1* | 12/2015 | Moon | G06F 3/0619 711/103 |
| 2016/0224588 | A1* | 8/2016 | Harijono | G06F 17/30156 |
| 2016/0321187 | A1* | 11/2016 | Bernat | G06F 12/1018 |

OTHER PUBLICATIONS

Li et al, "CacheDedup: In-line Deduplication for Flash Catching," 14th Usenix Conference on File and Storage Technology, pp. 301-314, Feb. 2016.
Ouyang et al, "SSD-Assisted Hybrid Memory to Accelerate Memcached over High Performance Networks," 41st International Conference on Parallel Processing, pp. 470-479, 2012.

* cited by examiner

OPTIMIZED READ CACHE FOR PERSISTENT CACHE ON SOLID STATE DEVICES

FIELD

This disclosure relates to the architecture and implementation of a read cache optimized for use, for example, with solid state devices (SSDs).

BACKGROUND

Read caches are well known, having been used to reduce the latency associated with accessing slow storage devices for many years.

Typically, caches are implanted in random access memories (RAM), which have much faster read and write cycle times than the storage devices where the actual data is stored. For example, CPU caches use very fast local memory to cache data that is stored in the computer's main memory. Storage controllers often implement caches that are used to replicate commonly used data that is stored on slower rotating storage, such as magnetic or optical disks.

As technology progresses, there are more options for memory and cache devices. For example, traditionally, there is a hierarchy of memory. This hierarchy includes one or two CPU caches, local memory typically in the form of dynamic RAM (DRAM) and magnetic storage or hard disks. As one traverses the hierarchy, the capacity of each memory device is much larger than the previous one, but the access time is also much slower.

Recently, solid state disks, or SSDs, have gained popularity as their density has increased. These devices now offer the ability to storage hundreds of gigabytes (GB) in a non-volatile or persistent manner. Further, their access times, which is the time required for the device to retrieve data, are much faster than traditional hard drives.

However, unlike other storage devices, there are several anomalies with SSDs. First, while read operations from SSDs may be in arbitrary sizes, write operations must be in multiples of a block size. Thus, regardless of the size of the data to be written, the entire block must be rewritten. Similarly, entire blocks must be erased at one time. Additionally, write operations are slower than read operations. Finally, SSDs also may have a limit on the number of write operations that may be performed to a particular block. These attributes make SSD suboptimal for many traditional cache applications.

However, most caching algorithms are designed for traditional memories, where read and write operations are nearly symmetric in terms of performance. Therefore, it would be beneficial if there was a read cache that was optimized for operation with a SSD device.

SUMMARY

Systems and methods for a content addressable cache that is optimized for SSD use are disclosed. One of the goals of this system is to approach only one SSD read on a hit, and to approach zero SSD reads on a miss. Similarly, when data is inserted into the cache, only slightly more than one SSD write on average is required, because this system does not require data and metadata to be updated on the SSD transactionally. In some embodiments, the cache utilizes an identifier array where identification information is stored for each entry in the cache. However, the size of the bit field used for the identification information is not sufficient to uniquely identify the data stored at the associated entry in the cache. A smaller bit field increases the likelihood of a "false positive", where the identification information indicates a cache hit when the actual data does not match the digest. A larger bit field decreases the probability of a "false positive", at the expense of increased metadata memory space. Importantly, a "false positive" in the identification information does not generate a false positive in the actual read data, as a hash can be performed to verify the correctness of the data at that entry. Thus, the architecture allows for a compromise between metadata memory size and processing cycles.

BRIEF DESCRIPTION OF THE DRAWINGS

For a better understanding of the present disclosure, reference is made to the accompanying drawings, which are incorporated herein by reference and in which.

DETAILED DESCRIPTION

The present disclosure describes the implementation of a read cache within a solid state memory (SSD). However, the disclosure is not limited to this embodiment. For example, the implementation may be applied to any persistent storage device.

The present disclosure describes the use of a SSD to implement a digest-to-content (D2C) cache for a content addressable cache architecture. Of course, this approach may be used for other architectures as well. The cache is stored in one or more memory elements, all of which are accessible by a processing unit. At least one of these memory elements may be non-volatile, meaning that its contents are not lost when power is removed from the device. Others of the memory elements may be volatile. The memory elements also contain the instructions which are executed by the processing unit. By executing these instructions, the processing unit is able to access the cache and perform the look up operations and hash calculations described herein. The processing unit may be a server, a personal computer, a multi-core processor, a storage controller, a network adaptor or any other suitable processor.

In operation, the processing unit accesses memory through the use of addresses. Each system address maps to a unique location, which may be in DRAM, SSD, or some other memory element. A cache is used to accelerate the speed of an access to memory. For example, a fast memory may hold duplicate copies of data that is originally located in a slower memory (or disk drive). In certain embodiments, a cache is accessed by its address. In other words, the system address requested by the processing unit is used to index into the cache to determine if a cached copy of the requested data is available. In other embodiments, a cache may be accessed based on the content that it stores. This technique may be useful when multiple locations in memory hold the exact same data. In this way, rather than using multiple cache locations to store the identical data, that content is only stored once in the cache.

Figure 1:
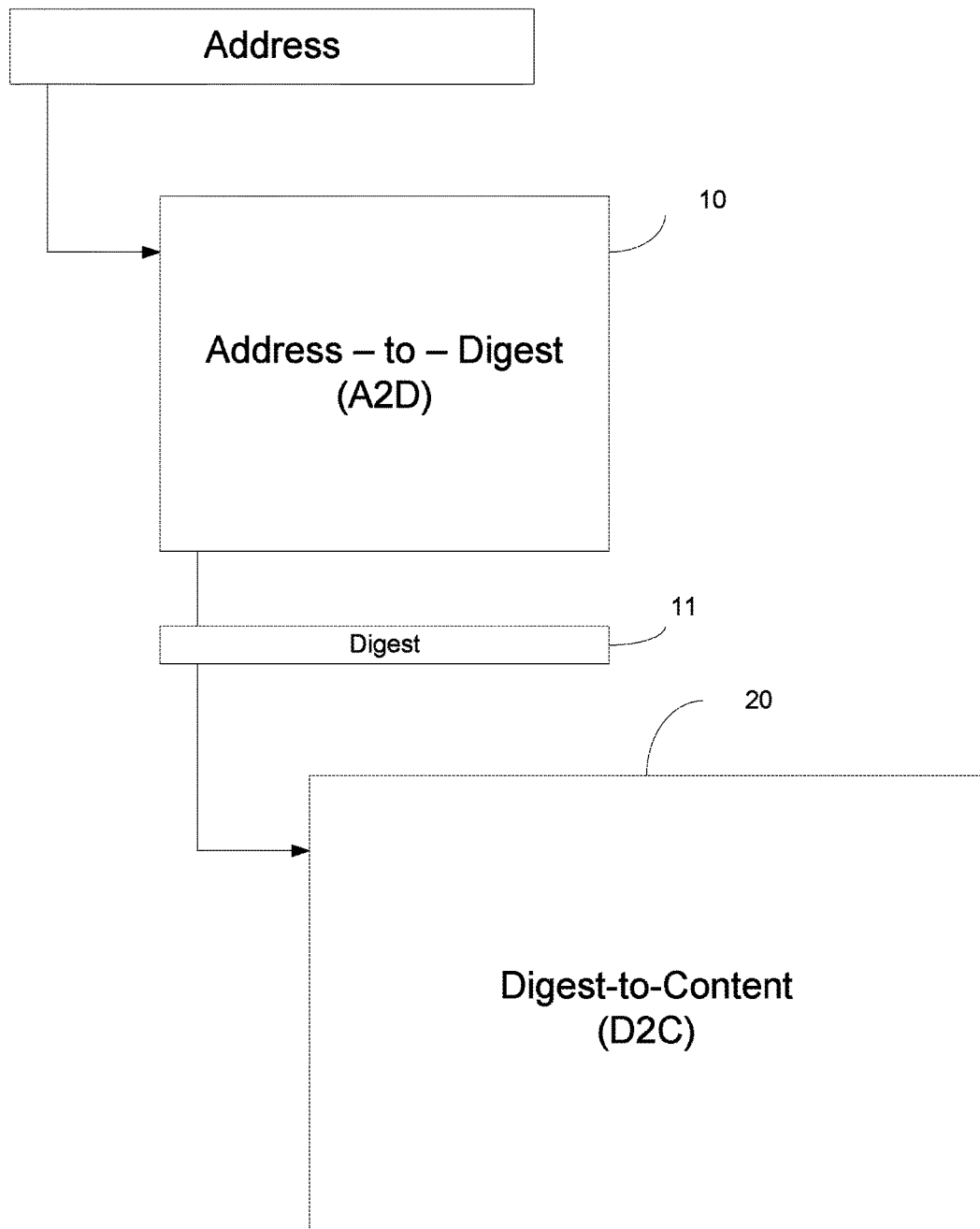
FIG. 1 shows the general architecture of a content addressable cache.

A content addressable cache may include two different components, as shown in FIG. 1. First, the system address is used to index into an address-to-digest (A2D) cache 10. The system address is an indirect pointer or the actual address of a data buffer containing a block of content, which may typically be 512 byte or 4 Kbytes in size. The system address uniquely identifies a memory location containing a block of content, where the block of content may typically be 512 byte or 4 Kbytes in size. The A2D cache uses the address to determine whether a digest exists for this entry. If the address entry is not in the A2D, then there is a cache miss, and the system must retrieve the data from its original location, which may be, for example, a HDD. In the scenario where the address entry is found, the A2D cache returns a digest 11. This digest 11 is a representation of the data that is stored at the block which includes the address of interest. In certain embodiments, the digest 11 may be a hash of the actual data. For example, the cache may be used to store data in 4 KB blocks. A hash may be performed on this block to generate a digest, which is much smaller in size than the original 4 KB block. In one particular embodiment, the digest 11 may be produced using SHA-1 (Secure Hash Algorithm-1) to create a 20 byte (160 bit) digest. Of course, the disclosure is not limited to this implementation and any technique may be used to create the digest. Thus, the digest 11 represents a unique signature calculates for a read or write request. As stated above, in certain embodiments, the signature is generated using a cryptographic algorithm, such as SHA-1. The digest 11 is then used to index into the digest-to-content (D2C) cache 20. If the entry of this digest 11 exists in the D2C cache, the block of data corresponding to this entry is returned. If the entry for this digest 11 does not exist, a cache miss has occurred, and the data must be retrieved from its original source.

Figure 2:
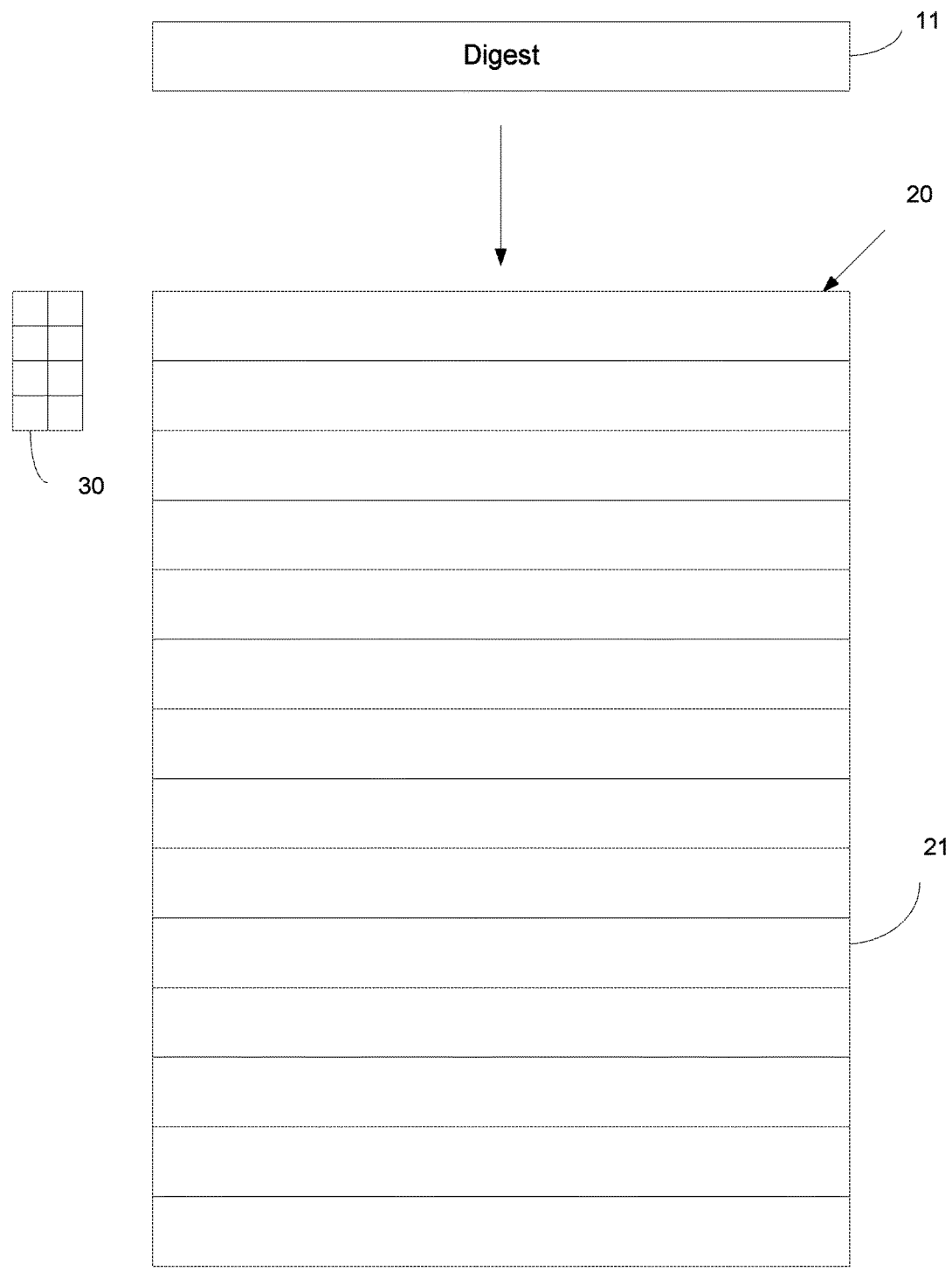
FIG. 2 shows the general mapping from a digest entry to a cache entry.

FIG. 2 shows a first embodiment of a D2C cache 20 optimized for use with a SSD. In this embodiment, the D2C cache may be a fully associative cache, where the entry for the digest 11 may be located anywhere within the D2C cache 20. The D2C cache 20 comprises a number of entries 21, where each entry 21 is used to store a block of data. As described above, a block of data may be 4 KB, although other sizes may also be used. In this embodiment, each entry 21 of the D2C cache 20 contains only data. In other words, there are no tags or metadata associated with each entry 21 in the D2C cache 20. In this embodiment, the hash for each entry 21 is calculated and compared to the digest 11 to determine whether there is a cache hit. The hash for each entry 21 is calculated using the same algorithm as is used to create the digest 11. Thus, the term "digest" is used to represent the unique signature for the requested block of data, while the term "hash" is used to represent the signature for a particular block on data in the D2C cache 20. Thus, when the block of data at a particular entry 21 represents the requested block of data, its hash will be exactly the same as the digest 11.

In other words, in this embodiment, each entry 21 of the D2C cache 20 is read, and the hash of that entry is calculated. That calculated hash is then compared to the digest 11 to determine whether it is a cache hit. If the calculated hash matches the digest 11, a cache hit has occurred and the data stored in that particular entry 21 is returned. If the calculated hash does not match the digest 11, the process is repeated for the next entry 21 in the D2C cache 20. This is repeated until either a cache hit occurs or hashes for all entries in the D2C have been calculated and compared to the digest 11.

While this method may be compute intensive, in certain embodiments, the system may include one or more multi-core processors. Each processor core may be used to calculate a digest for a particular entry. Thus, this process may occur in parallel, thereby reducing the time required to determine whether there is a cache hit.

This method requires E reads to determine that there is a cache miss, where E is the number of entries 21 in the D2C cache 20. In other words, this method requires that every entry 21 in the D2C cache be read to determine a cache miss. It also requires, statistically, roughly E/2 reads for a cache hit.

In a further embodiment, there may also be a metadata storage element 30. This metadata storage element 30 is used to hold information about each entry 21 in the D2C cache 20. For example, the metadata storage element 30 may hold information regarding the age of each entry 21 in the D2C cache 20. This information may be used to determine which entry 21 to evict when a new entry is to be added to the D2C cache 20. For example, any number of known techniques may be used to determine which of the pages to replace, including LRU (Least Recently Used), frequency based or another technique. In certain embodiments, the metadata storage element 30 is configured as a set of bit fields, where some number of bits is associated with each entry 21 in the D2C cache 20.

Figure 3:
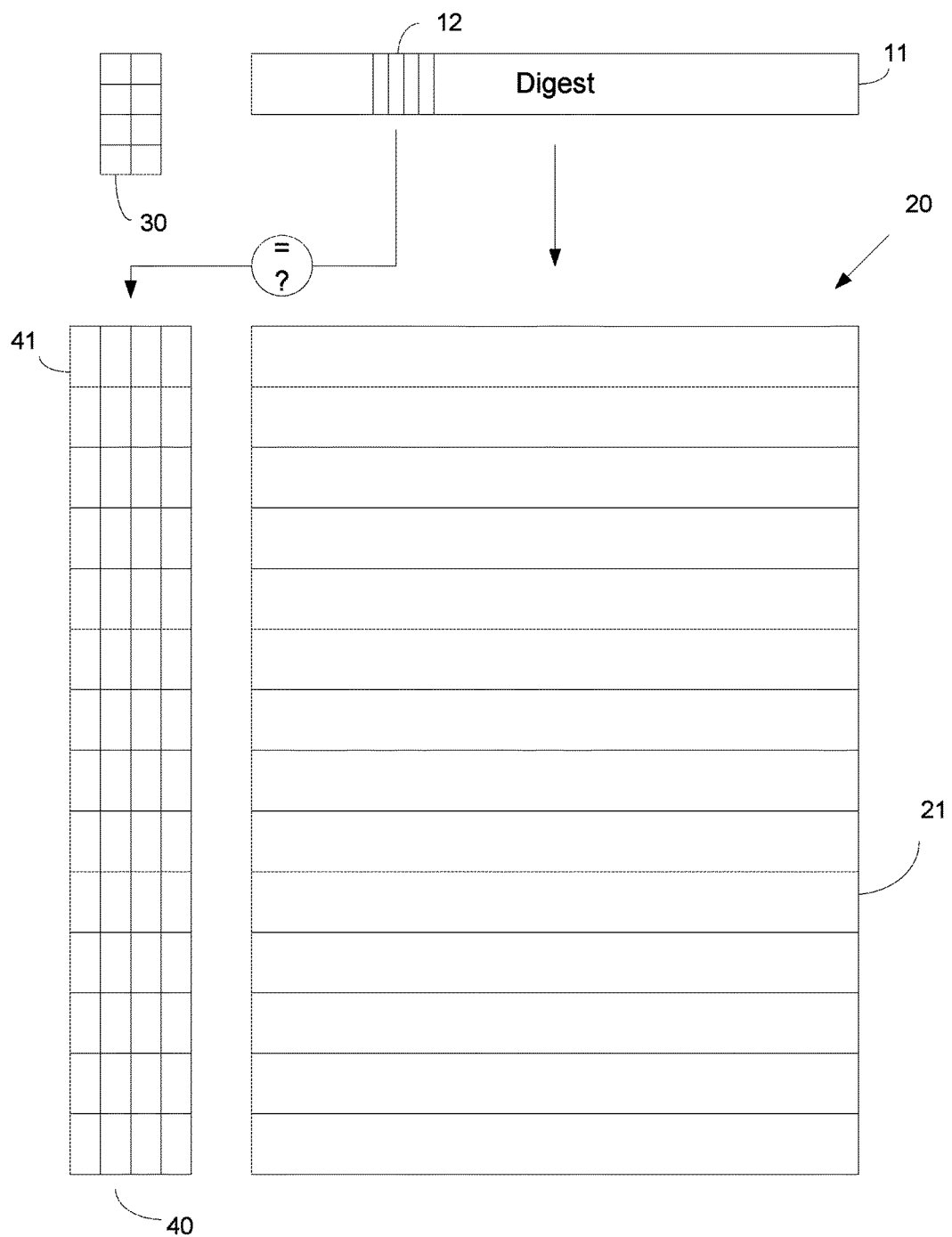
FIG. 3 shows a first enhancement to the mapping of FIG. 2.

FIG. 3 shows an enhancement to the D2C cache of FIG. 2. Like the embodiment of FIG. 2, this embodiment may include a metadata storage element 30, having the same function as that described above. In this embodiment, an identifier array 40 is also used, which comprises identification information 41 associated with each entry 21 in the D2C cache 20. This identification information 41 provides some indication of the hash of the data contained in the entry 21 associated with that identification information 41.

For example, when an entry 21 is added to the D2C cache 20, its hash may be calculated. Several bits from that calculated hash may be stored as the identification information 41 for that entry 21. The number of bits that are stored as identification information 41 may be selected based on implementation goals. In certain embodiments, the identification information 41 may represent the entire hash of that entry 21.

Later, when the processing unit requests a particular address, the A2D cache 10 uses the address to determine whether a digest exists for this entry. If the address entry is not in the A2D, then there is a cache miss. In the scenario where the address entry is found, the A2D cache 10 returns a digest 11. A bit field 12 from that digest 11 is then compared to the identification information 41 of each entry 21 of the D2C cache 20. If the particular bit field 12 of the digest 11 does not match the identification information 41, then this entry 21 cannot contain the requested data. Thus, there is no need to read this entry 21 or to calculate its hash. If, on the other hand, the bit field 12 from the digest 11 matches the identification information 41 of an entry 21, it is possible that this entry 21 contains the requested data. Therefore, the entry 21 is read and the hash is calculated. That calculated hash is then compared to the digest 11 to determine whether it is a cache hit. If the hash matches the digest 11, it is a cache hit and the data is returned. If the hash does not match the digest 11, this process continues until either a match is found, or all entries 21 have been considered. By using n bits to partially identify the hash of each entry 21, the number of reads associated with a cache miss may be reduced to about $E/2^n$. The number of reads associated with a cache hit may be reduced to about $E/2^{n+1}$. In other words, an 8 bit field for the identification information reduces the number of accesses to the D2C cache 20 by a factor of 256.

The number of bits used for the identification information 41 may be selected based on implementation requirements. For example, a larger bit field means that less unnecessary reads and hash calculations will be performed. However, the larger bit field also consumes more metadata memory space. Thus, the size of the bit field used for the identification information 41 represents a tradeoff between metadata memory space and computing cycles. In other words, in systems where there is an unconstrained amount of metadata memory, a large bit field may be used. In fact, the bit field may be made sufficiently large such that the identification information uniquely identifies the data entry. In systems where metadata memory is constrained and computing cycles are available, a smaller bit field may be used. This conserves metadata memory space at the expense of additional memory reads and hash calculations.

Advantageously, the identifier array 40 of identification information 41 may be stored in volatile memory, such as RAM and DRAM. This is because the data contained therein can be recomputed after a power failure or after any other condition that compromises the integrity of the identification information 41 simply by calculating the hash of each entry 21 in the D2C cache 20.

Figure 4:
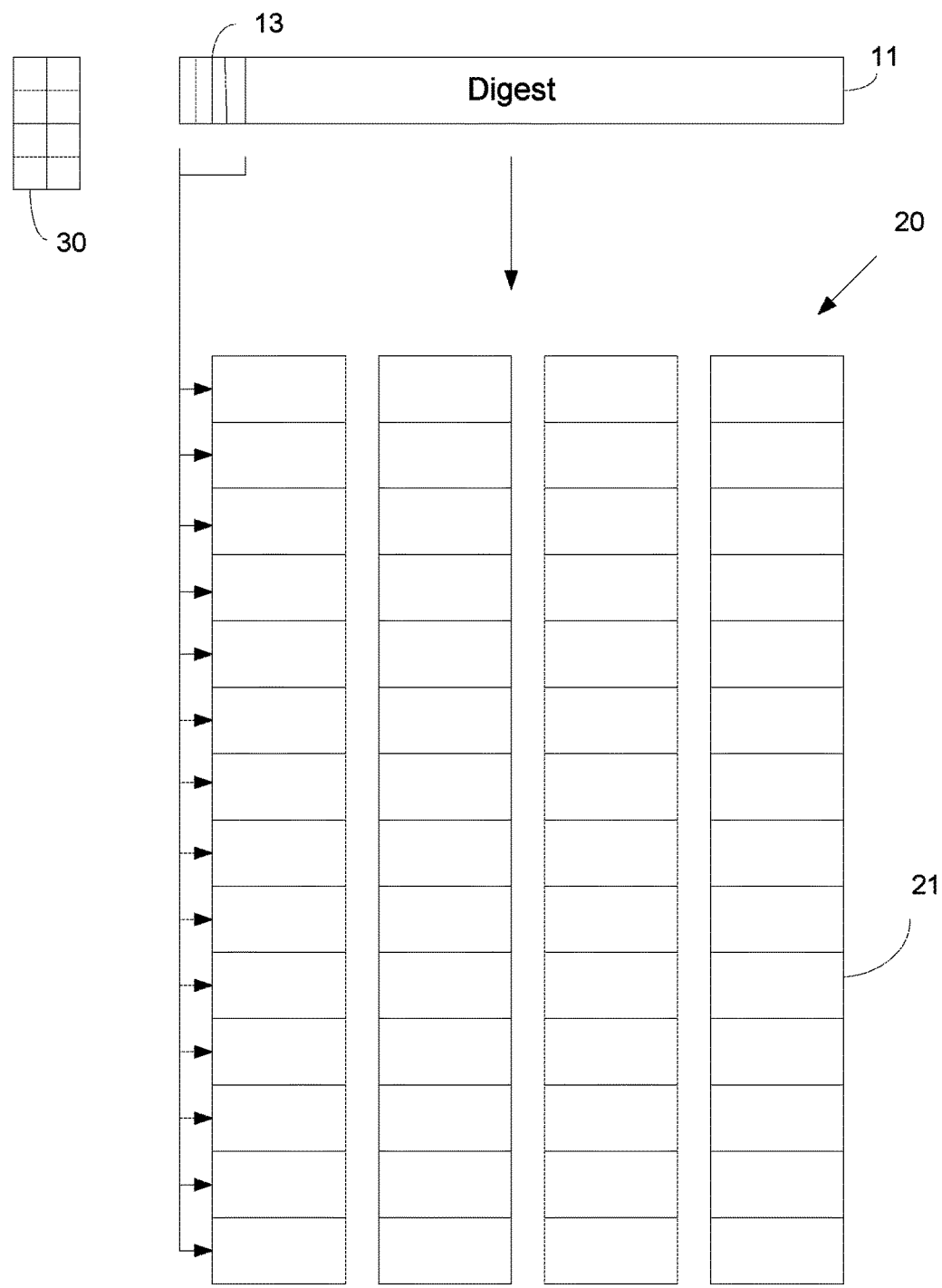
FIG. 4 shows a second enhancement to the mapping of FIG. 2.

FIG. 4 shows another enhancement to the implementation of FIG. 2. In this configuration, the D2C cache 20 is configured as an N-way cache, where N is a power of 2. In this particular illustration, N is equal to 4, but the disclosure is not limited to this embodiment. Unlike a fully associative cache, an N-way cache puts constraints on where data may be stored in the cache. For example, data entries that have a particular pattern of bits in their hash may be stored in a particular set. Assume that the D2C cache 20 holds 1 TB ($2^{40}$ bytes). Assume as well that each data entry 21 is 4 KB ($2^{12}$ bytes) and there are 32 ($2^5$) entries per set. Therefore, each set is 128 KB ($2^{17}$) bytes, and there are $2^{23}$ sets in the D2C cache 20. Therefore, 23 bits are needed to determine which of the sets a particular data entry 21 should be stored in. In one embodiment, these 23 bits may be a second bit field 13 in the digest 11, as shown in FIG. 4. In other embodiments, these 23 bits may be determined in a different manner. For example, these 23 bits may be the remainder when the digest 11 (or a portion of the digest 11) is divided by a predetermined value.

When the digest 11 is read from the A2D cache 10, bits are used to select the proper set in the N-way cache. The entries that are part of this set, the number of which is equal to N, are then read in order to calculate their hash. If the hash matches the digest 11, a cache hit is declared.

Thus, the use of an N-way cache reduces the number of data entries 21 that could match the digest 11 to a much smaller value (i.e. N reads, where N is typically less than or equal to 32). Thus, in the embodiment of FIG. 4, where the identification information 41 is not provided, there are N reads for a cache miss, and an average of ((N−1)/2)+1 cache reads for a cache hit. For example, with a 4-way cache, there would be 4 reads on a miss, and an average of 2.5 reads for a hit. With a 32-way cache, there would be 32 reads on a miss, and an average of 16.5 reads for a cache hit. With a 1-way (also called a direct mapped) cache, there would be one read on a hit and one read on a miss. In a 1-way cache, each set only has one entry, and that entry would be read to determine whether it was a hit or a miss.

Further, the use of an N-way cache does not increase metadata memory usage. Rather, the configuration of the metadata and content memory defines the N-way cache, so additional metadata is not required to identify where each set is located within the D2C cache 20.

Figure 5:
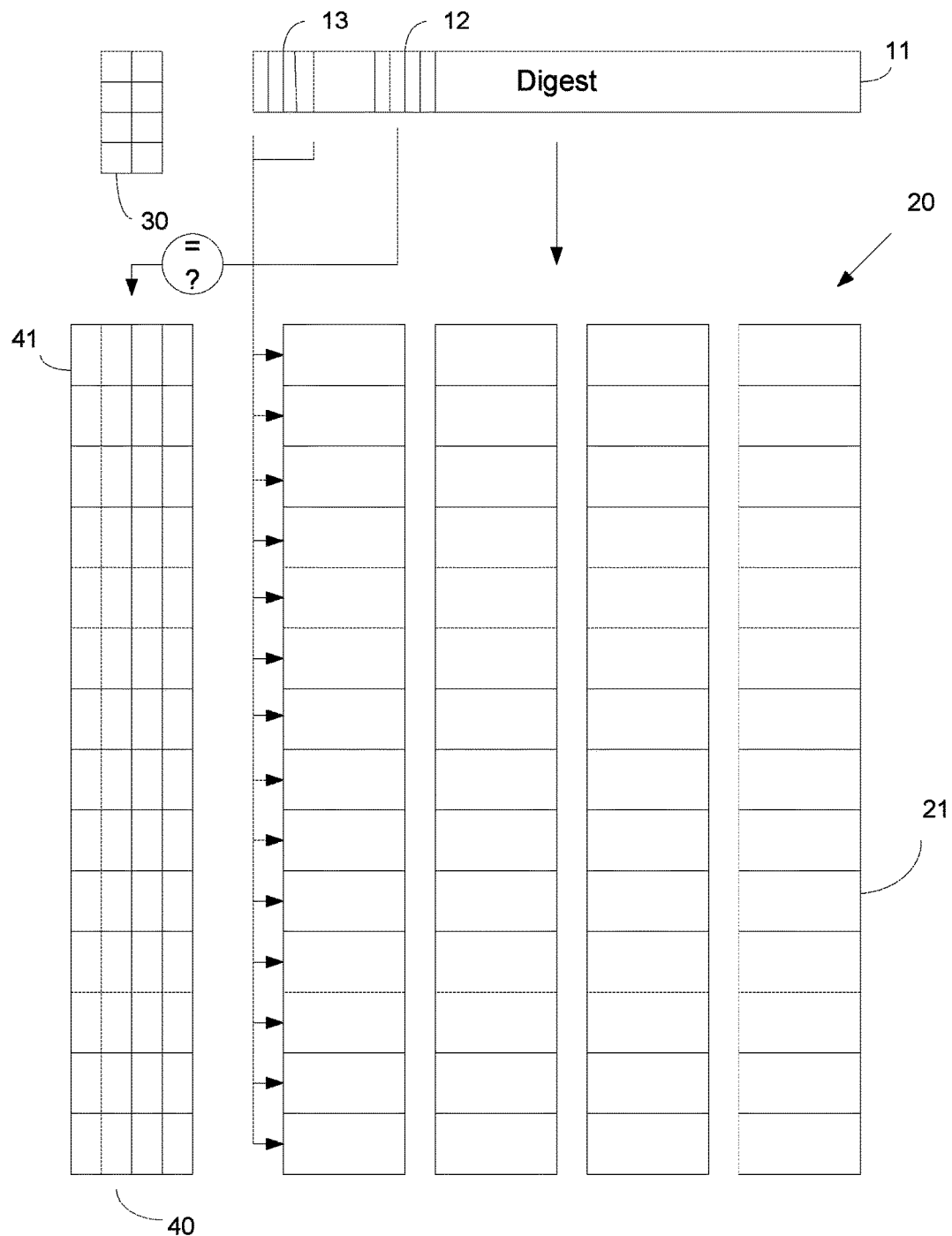
FIG. 5 shows an embodiment utilizing the enhancements of FIG. 3 and FIG. 4.

FIG. 5 shows an embodiment where the features of the embodiments of FIG. 3 and FIG. 4 are combined, such that an N-way cache is used in conjunction with the identifier array 40 containing identification information 41.

In this embodiment, the second bit field 13 of the digest 11 may be used to select the proper set in the N-way D2C cache 20. The identification information 41 for each entry 21 in this set is then compared to the bit field 12 in the digest 11. Only those entries where the identification information 41 matches the bit field 12 are read and their hashes are calculated. If the number of bits used for the identification information 41 is equal to $\log_2$ (N) (the log of the number of entries in each set), statistically, the number of reads required for a cache miss is reduced to 1. For example, if N=8, and there are 3 bits used for identification information, then on a miss, the probability of a false positive is ⅛, and since there are 8 entries in the set, statistically, the number of reads performed is 8*⅛=1. Of course, a different number of bits may be used for the identification information 41. A greater number of bits reduces the probability of an unnecessary read, at the expense of more metadata memory consumption. A lesser number of bits increases the probability of unnecessary reads, but saves metadata memory space.

The following example demonstrates the possible metadata memory savings that can be achieved using the approach shown in FIG. 5. In this example, digest 11 contains 160 bits, the D2C cache 20 contains 1 TB ($2^{40}$ Bytes), and each entry is 4 KB ($2^{12}$ Bytes). Further, a 32-way cache is employed. Thus, there are $2^{40}$ Bytes/($2^{12}$ Bytes), or $2^{28}$ data entries 21 in the D2C cache 20. There are also $2^{40}$ Bytes/(32*$2^{12}$ Bytes), or $2^{23}$ sets in the 2C cache 20. Thus, 23 bits from the digest 11 are used to uniquely identify the set in the D2C cache 20. These bits may be second bit field 13. Further, a bit field 12 may be used to partially identify the hash of each entry 21. Assuming that the bit field 12 is 3 bits, the metadata required for the entirety of the D2C cache 20 is equal to the number of data entries ($2^{28}$)*the number of bits of metadata per entry (8 bits). Thus, in this embodiment, $2^{36}$ bits of metadata are required. Thus, for a 1 TB cache, 256 MBytes of metadata are required. However, this number is far smaller than the amount of metadata needed in conventional caches. For example, in a conventional cache, 23 bits of the digest 11 are used to denote the set in the D2C cache 20. However, the remaining 137 bits (i.e. 160-23) of the digest 11 are compared to the metadata stored for each entry in the D2C cache. In this way, there are no unnecessary reads of the data entries in the D2C cache. However, this approach requires a much larger amount of metadata. Specifically, the minimum required storage is defined as the number of data entries ($2^{28}$)*remaining bits of digest (137 bits), or 4,384 Mbytes! Thus, the implementation described in FIG. 5 saves over 4 Gbytes of metadata memory, as compared to traditional approaches. However, this savings in metadata memory is counterbalanced by a 12.5% rate of false positives. This is based on a $\frac{1}{2}^8$ (due to 8 bits for the bit field 12) probability of a false positive, multiplied by 32 entries in the group. If the number of bits in the bit field 12 were increased to 16 bits, the probability is reduced to $32*\frac{1}{2}^{16}$, or 0.05%.

Thus, in one embodiment, the content addressable cache comprises a data store, or D2C cache, which may be stored in a non-volatile memory device, such as a SSD. The D2C cache is used to store the actual content, in the form of blocks of data. The D2C cache 20 is divided into a number of entries, where each entry 21 represents a block of data. Metadata, in the form of an identifier array 40, is associated with the D2C cache 20. The identifier array 40 contains identification information 41, where each identification information 41 is associated with a respective entry 21. The identification information 41 may be in the form of a bit field. In certain embodiments, the size of the bit field used for the identification information 41 is less than that necessary to uniquely identify the data in that entry 21 in the D2C cache 20. As described above, the digest 11 for an entry in the D2C cache may be 160 bits. If the identification information 41 uses less than 160 bits to identify an entry in the D2C, there is a possibility that the identification information 41 indicates a match, but the entry 21 is actually a cache miss. Reading the entry 21 and calculating its hash will show that the data does not match the digest 11. This possibility may be reduced by increasing the size of the bit field used for the identification information 41. Thus, the selection of the size of the bit field represents a tradeoff between the amount of metadata memory needed for identification information and the amount of processing cycles needed to compute the hashes of potentially erroneous cache hits. The probability of an erroneous match of the identification information 41 can be reduced through the use of an N-way cache. The selection of N determines how many entries 21 (i.e. N) must be considered when determining whether a cache hit has occurred. The use of an N-way cache in conjunction with an identifier array 40 may further reduce the probability of unnecessary reads.

As stated above, the identification information 41 may be stored in volatile memory since it can be reconstructed by calculating the hash of each data entry 21 in the D2C cache 20. This process involves reading every entry 21 in the D2C cache 20, which may be $2^{28}$ entries, as described above, and calculating the hash for each of these entries 21. This can certainly be done and will successfully reconstruct the identification information 41. However, in certain embodiments, it may be undesirable to consume this amount of time to reconstruct the identification information 41.

Thus, in certain embodiments, the identifier array 40 containing the identification information 41 may be stored in non-volatile memory. In certain embodiments, this metadata may be stored in the same SSD as the D2C cache.

However, data writes to SSDs are not like DRAM writes. For example, typically, large blocks of data must be written simultaneously. In other words, if a new data entry 21 is added to the SSD, the new entry, which may be 4 Kbytes, can be written to the SSD. However, the identification information 41, which may be only a few bytes, cannot be written without writing a much larger block. Thus, to rewrite one identification information entry, it may be necessary to rewrite tens or even hundreds of other entries in the identifier array 40. Further, unlike traditional memory, SSDs are subject to limits on the number of writes that can be performed. Therefore, rewriting tens or hundreds of metadata entries each time a new data entry 21 is added to the D2C cache 20 may not be practical.

There are several ways that this issue may be addressed. In each embodiment, a copy of the metadata is also stored in volatile memory. The copy of the metadata stored in volatile memory is maintained so that it is always updated every time a data entry is changed in the D2C cache. However, this volatile metadata will be destroyed when power is removed. If the power is removed in an orderly manner, the volatile metadata may be written to the identifier array 40 in the SSD prior to the removal of power. To reduce writes, the volatile metadata may also include a dirty bit. For example, the memory may be configured such that each metadata entry is 4 Bytes. If the smallest block size that can be written in the SSD is 4 Kbytes, then 1 K metadata entries fit in each block. Of course, this is purely illustrative, and other block sizes and metadata entry sizes may be used. In one embodiment, each metadata entry has its own dirty bit. In this scenario, if none of the dirty bits associated with a particular block are set, that block of volatile metadata has not been changed, and therefore there is no need to rewrite it to the identifier array 40 in the SSD. In another embodiment, there is one dirty bit for all metadata entries in a particular block. In this case, if that dirty bit is not set, it implies that none of the metadata entries in that block have been changed, and the volatile metadata does not have to be written to the identifier array 40 in the SSD. This allows optimized updating of the identifier array 40 in the SSD in the event of an orderly power down.

However, in the event of a power failure or other restart condition, the contents of the identifier array 40 will not reflect the prior state of the volatile metadata. Other conditions may also compromise the integrity of the identifier array 40. There are several mechanisms that may be used to address this.

Figure 6:
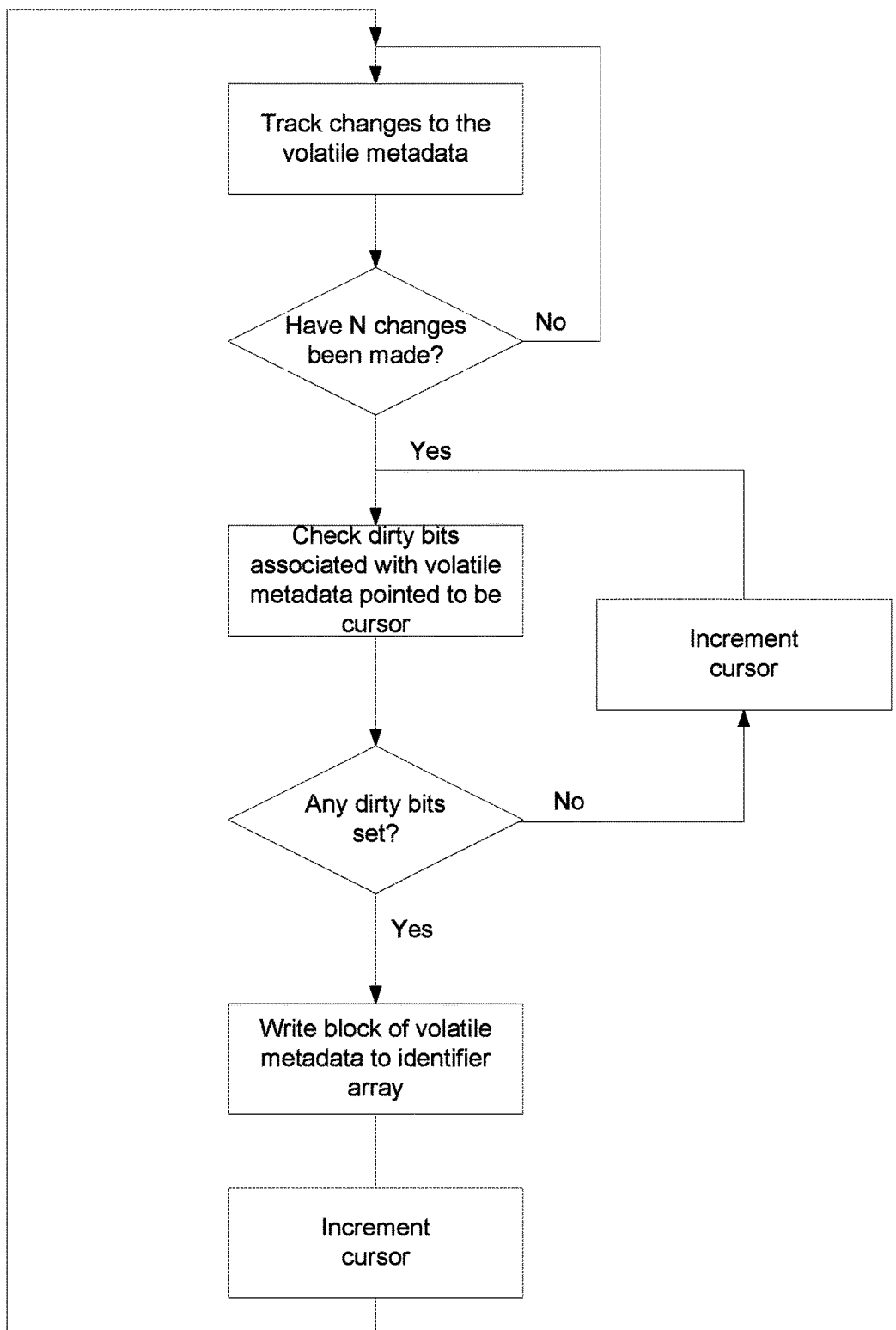
FIG. 6 shows a method of updating the identifier array in the SSD.

In a first embodiment, the system tracks changes to the volatile metadata. In other words, every time a new data entry is written to the D2C cache, the volatile metadata is updated with identification information, as described above. After some predetermined number of changes to the volatile metadata, a block of volatile metadata is written to the identifier array 40 in the SSD. For example, there may be a cursor that points to a particular block of the volatile metadata. After the predetermined number of changes has been made to the volatile metadata, the block of volatile metadata pointed at by the cursor is written to the identifier array 40 in the SSD. The cursor is then incremented to the next block in the volatile metadata. To save writes, a dirty bit may be used to avoid unnecessary writes, as described above. In one embodiment, the next block of volatile metadata with its dirty bit set is written to the identifier array 40 in the SSD. This sequence is illustrated in FIG. 6. While this embodiment does not guarantee that all of the data in the identifier array 40 is up to date, it does serve to reduce the "staleness" of the identifier array 40. For example, the blocks that were updated just prior to the power failure or restart are likely to be correct, while the block pointed to by the cursor is most likely to be incorrect.

In another embodiment, a change log is maintained in non-volatile memory. In certain embodiments, the change log may be stored in the SSD with the D2C cache 20. In this embodiment, each time a new data entry 21 is written to the D2C cache 20, the volatile metadata is updated, and the update is recorded in the change log. Thus, after a power failure, restart or other condition that compromises the integrity of the metadata, the identifier array 40 is read from SSD into volatile memory to create the volatile metadata. The changes recorded in the change log are then applied to the volatile metadata. This further reduces the chances that the volatile metadata indicates an erroneous cache hit, when the actual hash of the data entry does not match the digest.

In another embodiment, a log is maintained in volatile memory. When the volatile memory is updated, the update is added to the log in volatile memory. This log in volatile memory will be written to the change log in the non-volatile memory when the size of the log is equal to the block size of the non-volatile memory. For example, if the non-volatile memory has a block size of 4 Kbytes, the log from volatile memory will be written to the non-volatile memory when its size is 4 Kbytes.

In another embodiment, these techniques are both used, where the identifier array 40 is periodically updated, and a change log is also employed.

In this embodiment, because a block of the metadata is written to the SSD every k updates, and the change log is written to SSD every j updates, on average, 1+1/j+1/k blocks are written to the SSD on every update. If j and k are greater than or equal to 200, then writes of metadata will occur on less than 1% of the updates.

In certain embodiments, the metadata may be maintained in a byte-addressable non-volatile memory. This removes the need to save or log in volatile memory the changes made to the metadata. Rather, changes to the metadata may be made immediately. Thus, the byte-addressable non-volatile memory may be written to in the same manner as the volatile memory, as described above.

Recreating the metadata after a power failure, restart or other condition may be done in a variety of ways.

As stated above, the identification information 41 may be stored in volatile memory since it can be reconstructed by calculating the hash of each data entry 21 in the D2C cache 20. Recreating the metadata involves reading every entry 21 in the D2C cache 20, which may be $2^{28}$ entries, as described above, and calculating the hash for each of these entries 21 at startup. However, in certain embodiments, it may be undesirable to consume this amount of time to reconstruct the identification information 41.

Figure 7:
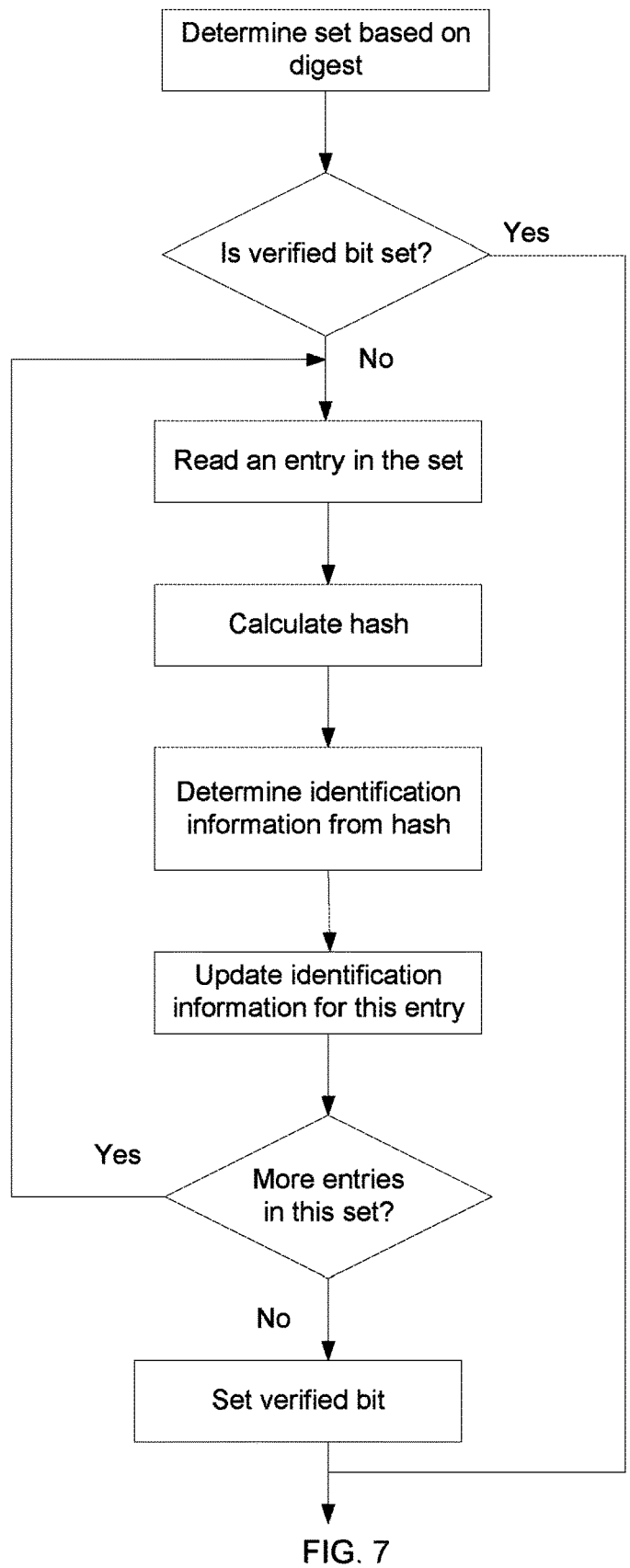
FIG. 7 shows a sequence for recreating the identification information after a power outage or restart.

In another embodiment, the metadata may be rebuilt in the volatile memory on an N-way basis, based on access. This sequence is illustrated in FIG. 7. First, when an address is presented to the A2D cache 10, it returns a digest. From that digest, the set where the entry would be located can be determined (as described in FIG. 3). A single "verified" indicator may be used to denote whether all of the metadata associated with this set has been validated since the last power outage or restart. If this indicator is set, then the identification information 41 is valid and can be used. If this indicator is not set, then the identification information 41 associated with every entry in this set is reconstructed. As shown in FIG. 7, this is done by calculating the hash of each entry in this set and saving the appropriate information from that hash in the identification information 41. For smaller values of N, this may be a very attractive technique, as there are a limited number of hashes to be computed each time a new set is accessed. In certain embodiments, the identification information 41 may be insufficient to uniquely identify the entry in the D2C cache 20. In other embodiments, the identification information 41 may uniquely identify the entry in the D2C cache 20.

In another embodiment, such as when the metadata is stored in the non-volatile memory and is periodically updated, the metadata memory from the non-volatile memory may be loaded into volatile memory at startup. Due to the fact that all of the metadata stored in the non-volatile memory may not be completely up to date, it may be necessary to verify the metadata, once loaded into volatile memory. In one embodiment, the first time any entry is read from the D2C cache, the hash is recalculated to ensure that it is the right data (i.e. that the identification information 41 is consistent with the data in the entry). After that point in time, however, subsequent accesses to that entry can rely solely on the metadata in the volatile memory. In one embodiment, there is an additional "verified" indicator in volatile memory per entry, which indicates whether the identification information 41 is known to match the data at that entry. This bit is initialized to 0 at startup, and is set to 1 upon a successful compare. Once the "verified" indicator has been set, there is no need to check the hash of the entry again.

Figure 8:
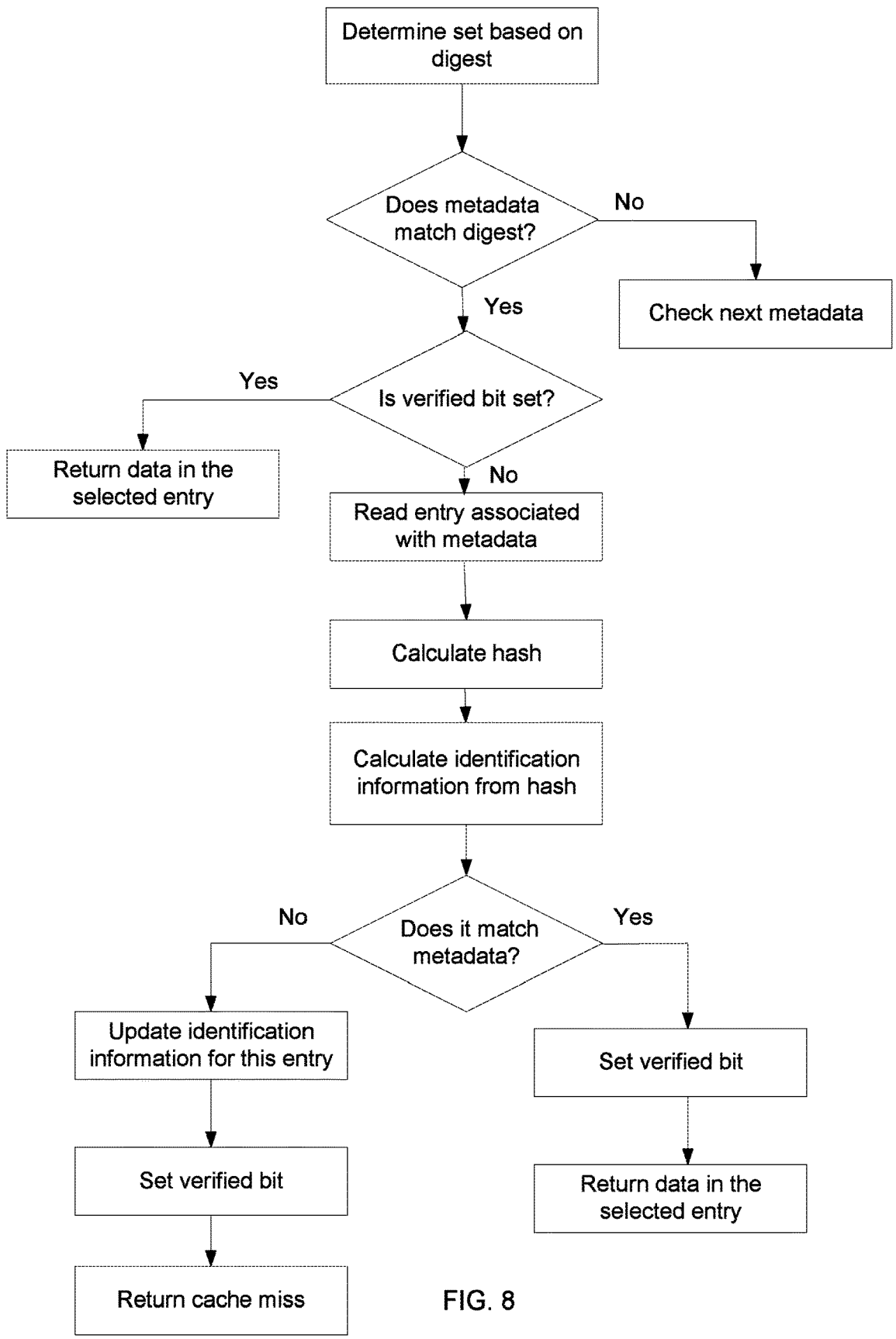
FIG. 8 shows a sequence for verifying the identification information after a power outage or restart.

For example, based on the identification information 41, the system may believe that a particular entry in the D2C cache has the requested block of data. Based on the metadata, that data at that entry is read. If the "verified" indicator is set to 0, its hash is calculated. If the hash matches the metadata, the "verified" indicator is set and the data at that entry is returned as a cache hit. If the data does not match the metadata, the identification information 41 is updated with the proper information and the "verified" indicator is set. This would be recorded as a cache miss. If the "verified" indicator is set, there is no need to recalculate the hash, the data at that entry can be used immediately. This sequence is shown in FIG. 8.

While the above description details an embodiment where the data is stored in the D2C cache, other embodiments are also possible. For example, in certain embodiments, the data may be compressed so that a 4 Kbyte block of data occupies less than 4 Kbytes of memory space. In certain future embodiments, the metadata may indicate the location of the compressed data in the D2C cache. In yet other embodiments, the data may be of varying size.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of minimizing metadata for a content addressable cache, the content addressable cache comprising a plurality of entries, each entry containing a block of data, the content addressable cache also containing identification information associated with each entry in the content addressable cache wherein the identification information is created based on a hash of the block of data at the entry, comprising:
   determining a digest which is representative of data stored at a block associated with a system address;
   comparing a portion of the digest to the identification information associated with an entry, wherein the identification information is insufficient to uniquely identify the contents of the block of data at the entry;
   calculating a hash for the block of data contained in the entry, only if the portion of the digest matches the identification information associated with the entry;

comparing the hash to the digest; and
returning the block of data contained in the entry as a cache hit if the hash matches the digest.

2. The method of claim 1, wherein, in the event that the hash does not match the digest, the portion of the digest is compared to identification information of a second entry and the calculating, comparing, returning and indicating steps are repeated for the second entry only if the portion of the digest matches the identification information associated with the second entry.

3. The method of claim 1, wherein the content addressable cache is configured as an N-way associative cache, having a plurality of sets, wherein each set comprises N entries.

4. The method of claim 3, further comprising:
using the digest to determine a set associated with the system address;
wherein the comparing of the portion of the digest to identification information is only performed if the entry belongs to the set associated with the system address.

5. The method of claim 4, wherein the set is selected based on a subset of bits that comprise the digest.

6. The method of claim 1, wherein the identification information comprises a subset of bits that comprise the hash of the block of data.

7. A method of recreating metadata for an N-way associative content addressable cache stored in non-volatile memory, wherein the cache comprises a plurality of sets, each with N entries, comprising:
determining a digest representative of data stored at a block associated with a system address;
using the digest to determine a set associated with the system address;
checking if a verified indicator, located in the volatile memory, associated with the set, is set;
and, if the verified indicator is not set:
calculating a hash for each block of data contained in the N entries in the set;
updating identification information for each of the N entries based on the calculated hash; and
setting the verified indicator once identification information for all N entries in the set has been updated.

8. The method of claim 7, wherein the identification information is insufficient to uniquely identify the block of data in the N entries.

9. The method of claim 7, wherein the identification information uniquely identifies the block of data in the entry.

10. The method of claim 7, further comprising returning one of the blocks of data in the set as a cache hit if the calculated hash of that entry matches the digest.

11. A method of recreating metadata for a content addressable cache stored in non-volatile memory, wherein metadata for each entry in the cache is also stored in non-volatile memory, comprising:
copying the metadata from non-volatile memory to volatile memory to create an array, comprising identification information for each entry in the cache, wherein some of the metadata may be out of date;
determining a digest representative of data stored at a block associated with a system address;
comparing the digest to the identification information for a first entry in the content addressable cache; and
if the digest matches the identification information:
checking if a verified indicator associated with the first entry is set;
returning the block of data contained in the first entry if the verified indicator is set; and
if the verified indicator is not set:
calculating the hash for the block of data contained in the first entry;
calculating identification information based on the hash;
comparing the calculated identification information to the identification information stored in the array; and
setting the verified indicator for the first entry and returning the data at the first entry if the calculated identification information matches the identification information stored in the array.

12. The method of claim 11, further comprising: if the calculated identification information does not match the identification information stored in the array:
updating the identification information stored in the array for the first entry with the calculated identification information if the calculated identification information does not match the identification information stored in the array;
setting the verified indicator for the first entry; and
returning a cache miss.

13. The method of claim 11, further comprising comparing the digest to the identification information for a second entry in the content addressable cache if the digest does not match the identification information of the first entry.

14. A method of minimizing metadata for a content addressable cache, wherein the content addressable cache is configured as an N-way associative cache, having a plurality of sets, wherein each set comprises N entries and each entry contains a block of data, the content addressable cache also containing identification information associated with each entry in the content addressable cache wherein the identification information is created based on the hash of the block of data at the entry, comprising:
determining a digest representative of data stored at a block associated with a system address;
using the digest to determine a set associated with the system address;
calculating a hash for the block of data contained in an entry, only if the entry belongs to the set associated with the system address;
comparing the hash to the digest;
returning the block of data contained in the entry as a cache hit if the hash matches the digest; and
indicating a cache miss if the hash does not match the digest.

15. The method of claim 14, wherein the set is selected based on a subset of bits that comprise the digest.

16. The method of claim 14, wherein, in the event of a cache miss, the digest is compared to the hash of a second entry and the calculating, comparing, returning and indicating steps are repeated for the second entry only if the second entry belongs to the set associated with the system address.

* * * * *